(12) United States Patent
Morris et al.

(10) Patent No.: US 6,727,343 B2
(45) Date of Patent: Apr. 27, 2004

(54) HETEROATOMIC POLYMER FOR MORE EFFICIENT SOLID POLYMER ELECTROLYTES FOR LITHIUM BATTERIES

(75) Inventors: Robert Scott Morris, Fairhaven, MA (US); Brian Gilbert Dixon, Sandwich, MA (US)

(73) Assignee: Phoenix Innovation, Inc., West Wareham, MA (US)

( * ) Notice: Subject to any disclaimer, the term of this patent is extended or adjusted under 35 U.S.C. 154(b) by 127 days.

(21) Appl. No.: 09/837,740

(22) Filed: Apr. 17, 2001

(65) Prior Publication Data

US 2002/0192563 A1 Dec. 19, 2002

(51) Int. Cl.[7] .................. C08G 79/04; C08G 75/00; C08G 61/00; C08F 26/00; H01M 10/40
(52) U.S. Cl. .................. 528/373; 429/314; 429/316; 429/317; 526/248; 528/394; 528/395; 528/397; 528/422
(58) Field of Search .................. 429/313, 314, 429/315, 316, 317; 526/248; 528/373, 394, 395, 397, 422

(56) References Cited

U.S. PATENT DOCUMENTS

| | | | | |
|---|---|---|---|---|
| 3,598,855 A | * | 8/1971 | Cyba | 528/394 |
| 4,390,689 A | * | 6/1983 | Jacquet et al. | 528/422 X |
| 4,798,773 A | * | 1/1989 | Yasukawa et al. | 429/313 |
| 5,393,621 A | * | 2/1995 | Chaloner-Gill | 429/314 |
| 5,593,795 A | * | 1/1997 | Chen et al. | 429/313 |
| 5,648,186 A | * | 7/1997 | Daroux et al. | 429/314 X |
| 5,972,539 A | * | 10/1999 | Hasegawa et al. | 429/314 |
| 6,180,287 B1 | * | 1/2001 | Watanabe et al. | 429/313 X |
| 6,312,814 B1 | * | 11/2001 | Kolouch | 526/248 |
| 6,472,104 B1 | * | 10/2002 | Ulrich et al. | 429/313 X |

* cited by examiner

Primary Examiner—Stephen J. Kalafut
(74) Attorney, Agent, or Firm—Perkins Smith & Cohen LLP; Stephen J. Gaudet

(57) ABSTRACT

A new type of polymer is described that represents a new composition of matter. This polymer contains alternating electronegative group III–VI elements connected with hydrocarbon or fluorocarbon linkages to form a polyalkyl or polyfluoroalkyl heteroatomic polymer. These polymers can be combined with lithium salts to form a solid polymer electrolyte for use in electrochemical systems such as batteries. These new solid polymer electrolytes exhibit lithium cation diffusion and lithium cation transport numbers that are superior to similar solid polymer electrolytes composed of polyethylene oxide.

12 Claims, No Drawings

HETEROATOMIC POLYMER FOR MORE EFFICIENT SOLID POLYMER ELECTROLYTES FOR LITHIUM BATTERIES

BACKGROUND OF THE INVENTION

Improvements in solid state lithium batteries have increasingly focused on the solid polymer electrolyte, because this component continues to be the major obstacle in fashioning solid state batteries that can displace their liquid electrolyte counterpart Perfection of a successful solid polymer electrolyte is the linchpin in obtaining a competitive solid state lithium battery.

One of the primary objectives of recent SPE research has been to improve the ionic conductivity of these materials. Historically, this research has dealt with a number of variations of the early poly(ethyleneoxide) [PEO] work of Armand (Armand, M. B.; Chabango, J. M. and Duclot, M., 2nd Int. Conf on Solid Electrolytes, Extended Abstracts 20–22, St Andrews, (1978)) in an attempt to find a polymer that could support good ambient temperature ionic conductivity. Early work involved making PEO more amorphous by including flexible groups in the polymer. Two representative examples in this approach include poly[bis-(methoxyethoxyethoxide)]phosphazene MEEP and polyethoxy(ethoxy-ethoxy-vinyl)ether PEEVE (Blonsky; P. M., Shriver; D. R.; Austin; P. and Allcock; J., *J. Am. Chem. Soc.*, 106, 6854, (1984)). Inclusion of siloxane links in a PEO copolymer has been another general approach to enhance the amorphous character of PEO. Unfortunately, both approaches exhibit short comings including poor mechanical properties which limit their appeal. Recently, the combination of thermoplastic polymers with liquid electrolytes (i.e. ethylene carbonate, propylene carbonate) resulted in a "gelled" electrolyte and represented a clever attempt to tap the better properties of solvents in a solid electrolyte (Abraham, K. and Alamgir, G. *J. Power Sources*, 43–44, 195–208, (1993)). Although the ionic conductivities of the gelled polymer electrolytes have been among the highest measured in a room temperature polymer electrolyte, problems persist, because of the dubious mechanical and chemical properties of these materials (Dautenzenberg, G.; et al, *Chem. Mater.*, 6, 538–42, (1994)).

All of these approaches have focused on using ether oxygens in the "solvent" (either a liquid or a polymer) to solubilize and coordinate lithium salt cations that carry the ionic charge through the electrolyte. In the case of the liquid electrolyte, the solvent is carried along with the cation through the bulk of the electrolyte. In the case of the true "solventless" solid polymer electrolyte, the polymer is stationary and the cations are moved along the chain from one ether oxygen (active site) to the next by the segmental motion of the polymer. This is one reason why amorphous polymers are superior to crystalline polymers in promoting ionic conduction. The amorphous polymer model of cations moving along the chain is an oversimplification. Gray gives a more graphic description of the process that takes into account ion-ion association, and inter and intrachain ion hopping (Gray, F. M., "Polymer Electrolytes", RSC Monograph, The Royal Society of Chemistry, Cambridge, UK, (1997)). However, as Gray points out, the exact mechanism of ion conduction in a solventless polymer is as yet unknown.

In early attempts to improve on the properties of PEO, amorphous analogs such as poly(ethyleneimine)[—$(CH_2CH_2NH)_x$—, PEI] and polyalkylene sulfides [—$([CH_2CH_2]_nS)_x$—, PAS] were prepared and combined with various metal salts to form SPEs. These materials were intended to be the polymeric analogs to amino and thia organic solvents such as acetonitrile and dimethylsulfoxide that have been shown to form useful aprotic electrolytes for lithium batteries. It was expected that the PEI and PAS polymers would be more amorphous and would lead to more conductive SPEs. Unfortunately, this was not the case, and both polymers were found to have properties that were, at best, equivalent to PEO. The instant invention is designed to overcome the shortcomings of the solid polymer electrolyte materials developed to date.

OBJECTS OF THE INVENTION

It is an object of the invention to provide the novel compounds of formulas I and II and a process of preparing the same.

It is another object of the invention to provide a novel process for the preparation of solid polymer electrolytes using polymer compounds of the formula I and various lithium salts.

It is still another object of the invention to describe novel uses of these new compounds.

These and other objects and advantages of the invention will become obvious from the following detailed description.

SUMMARY OF THE INVENTION

The present invention constitutes a new family of polymers that can be used for a variety of applications, including preparation of solid polymer electrolytes for batteries. The combination of inorganic elements with organic carbon segments to form a thermodynamically stable material is novel and heretofore unprecedented. The novelty of the proposed material lies in its unique combination of soft acid, strong acid elements linked together with organic spacers to provide a new material with an amorphous character and physical and chemical properties distinct from its counterparts polyethyleneoxide or polyethyleneimine.

One general embodiment of the present invention can be summarized by the general structure shown below.

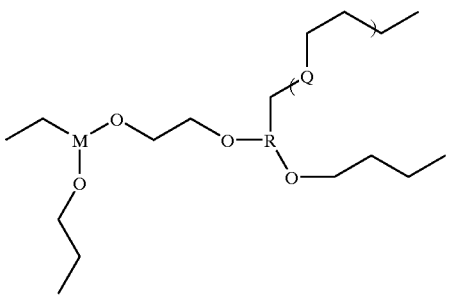

Formula I where R is an element chosen from the group P or B or Al and M is an element chosen from the group Si or Ti and Q is an element chosen from the group S, O or N. The phosphorus can be present in either the $^{+3}$ or $^{+5}$ oxidation state especially

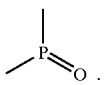

These elements are connected using hydrocarbon or fluorocarbon spacers, an example of which is the —CH$_2$—CH$_2$- ethylene linkage, and the entire molecule forms a heteroatomic polymer. The spacers of this polymer also include crosslinkage groups. The polymer can be of varying molecular weight ranging from 400 to 1,000,000 MW. The array of ethylene spacer and element groups, i.e.

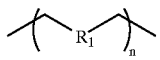

can vary from an even distribution of each ethylene spacer and element group to an uneven distribution in ratios of 2 Q1 groups to one Q2 group to 5 Q1 groups to 1 Q2 group. Besides using ethylene carbon spacers in this polymer, the elements can also be connected using propylene and butylenes spacers. In addition, combinations of ethylene and propylene or butylene spacers can be used to connect the heteroatomic elements in the polymer. The spacers can also have alternating odd and even numbers of —CH$_2$— or —CF$_2$-links. This will ensure greater amorphous character in the polymer. Fluorocarbon analogs to these hydrocarbon groups can also be employed together with hydrocarbon groups or in direct replacement for hydrocarbon groups. In addition to using the select elements directly, in certain circumstances some of these select elements can contain organic substitutents that modify the characteristics of the polymer. For example: in the case of P or N, an organic substitutent can be added prior to polymerizing the monomers used to prepare the polymer

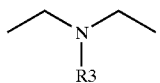

In this instance, the R3 group can be an alkyl or aryl group, e.g. methyl, nitrophenyl or aminophenyl group. The same circumstances apply to the triavalent element phosphorus. In this latter instance, the P atom could be connected to ethylene groups via an oxygen atom, or could be bonded directly to the carbon of the ethylene group or similar alkyl or fluoroalkyl substituent or spacer. Here again the species with phosphorus in the +5

oxidation state are also viable.

In another embodiment of the basic concept, of the essentials of the invention could be combined according to the following general structure:

Formula II

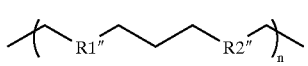

where R1 is an element chosen from the group N, B or S and R2 is an element chosen from the group: O or P. In addition, R1 can be O while R2 is P in this compound. In all cases, phosphorus can be in the $^+3$ or $^+5$ oxidation state. Once again, these elements are connected using ethylene or propylene spacers and the entire molecule forms a heteroatomic polymer. The polymer can be of varying molecular weight ranging from 400 to 1,000,000 MW. The array of alkylene element groups, i.e.

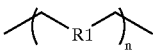

can vary from an even distribution of each distribution of ethylene element group to an uneven distribution in ratios of 2 R1 groups to one R2 group to 5 R1 groups to 1 R2 group. Besides using ethylene carbon spacers in this polymer, the elements can also be connected using propylene and butylene spacers. In addition combinations of ethylene and propylene or butylene spacers can be used to connect the heteroatomic elements in the polymer. These alkyl or fluoroalkyl spacers could be branched with alkyl or fluoroalkyl side chains emanating from the backbone of the spacer group. In addition to using the select unsubstituted elements directly, in certain circumstances some select elements can contain substitutents to modify their chemical characteristics and subsequently those of the polymer. For example: in the case of P or N, an organic substitutent can be added prior to polymerizing the monmers used to prepare the polymer

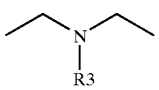

In this instance, the R3 group can be a aromatic or aliphatic in nature, e.g. methyl, phenyl, nitrophenyl or aminophenyl group. The same circumstances apply to the pentavalent form of phosphorus.

EXAMPLES

The novel process of the invention for the preparation of a compound of the formula II by reacting a compound such as ethyl phosphite with ethylene glycol as described in the following example. In the following examples, there are described several preferred embodiments to illustrate the invention. However, it should be understood that the invention is not intended to be limited to the specific embodiments.

Example 1

To prepare the oxyphosphorus polymer stoichiometric quantities of ethylphosphite and etheylene glycol are added to anyhydrous methylene chloride with Nafion 117 pellets as an acid catalyst. The solution mixture is then heated to 60° C. and refluxed under dry agron gas for 10 hours to effect the polymerization of the product. At the end of this period, the methylene chloride is removed using a rotary evaporator and the polymeric product is harvested, and purified using mutiple extractions with drymethylene chloride. The final product is dried overnight in a vacuum oven at 40° C.

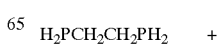

-continued

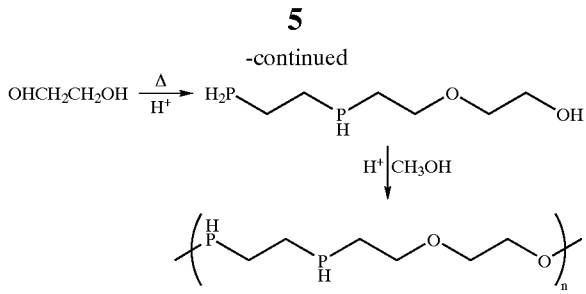

A similar procedure can be used to prepare polymers containing N and O as depicted below:

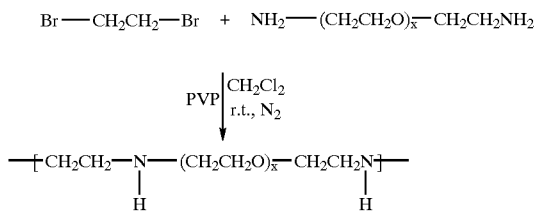

Example 2

As an alternative, compounds of the general formula I can be prepared according to the following reaction scheme:

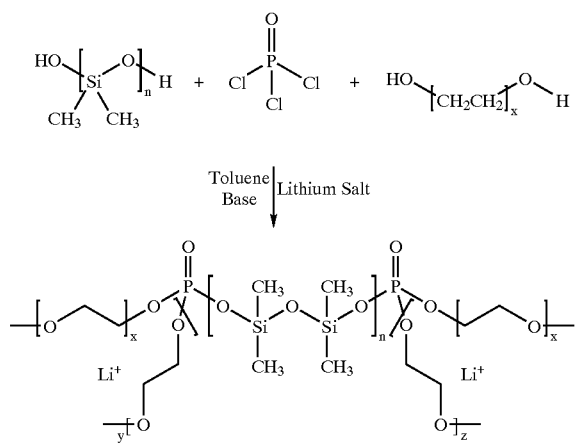

In this instance, stochiometric quantities of hydroxydimethylsiloxane is combined with trichlorophosphite and ethylene glycol in toluene and the mixture is acidified using Nafion 117 pellets as an acid catalyst. The solution mixture is then heated to 60° C. and refluxed under dry argon gas for 10 hours to effect the polymerization of the product. At the end of this period, the methylene chloride is removed using a rotary evaporator and the polymeric product is harvested, and purified using mutiple extractions with drymethylene chloride. The final product is dried overnight in a vacuum oven at 40° C. It is clear that the final product includes crosslinkages.

Example 3

Using these polymers and salts of lithium, one can easily prepare solid polymer electrolytes for use in lithium batteries. In this manner, we have prepared a solid polymer electrolyte composed of a P, O polymer and lithium perchlorate ($LiClO_4$) by dissolving the $LiClO_4$ in anhydrous ethanol and then combining this solution with a 400 MW P, O polymer in an 8:1 $Li^+$:O, P ratio. This resulted in a viscous, clear liquid. An alternative approach is to dissolve the lithium salt and the polymer in dry methanol and then remove the methanol using a vacuum apparatus. The product is a clear film. Newer lithium salts such as lithium bisfluoroethanesulfonylimide (BETI) or lithium bisperfluoromethanesulfonylimide can also be used in place of lithium perchlorate.

Example 4

To demonstrate the utility of the proposed polymer in a solid polymer electrolyte, we characterized the bulk conductivity and ionic diffusion properties of polymer electrolytes prepared using these new polymers at room temperature using a Radiometer Model PGZ 301 electrochemical test analyzer together with model 4 Voltamaster impedance software. A polypropylene test cell fitted with two polished, stainless steel blocking electrodes and a Sensotec model GM force gauge together with a steel screw-type pressure holder completed the test apparatus used for the impedance measurements.

Polymer/salt complexes were prepared using the new polymers and $LiClO_4$. A second test SPE was prepared using the new polymer and lithium trifluoromethane sulfonimide (LiIm). A control SPE was prepared using $5 \times 10^5$ MW PEO and $LiClO_4$ (Aldrich Chemical Co.) according to the procedures of Weston & Steele (Weston; J. E. and Steele; B. C. H., *Solid State Ionics*, 7, 81–88, (1982)). All test were conducted in a dry glove box at room temperature. The conductivity of the electrolyte was determined by taking the reciprocal of the bulk resistance ($R_b$) at the intercept of the real axis (Z') of the Nyquist plots. In keeping with literature reports Fritz, and Khun, *J. Power Sources*, 41, 253–261, (1993) and Capuano, F.; Croce, F. and Scrosati, B., *J. Electrochem. Soc.* 13, (7), 1918–1922, (1991)), we acquired impedance spectra for each SPE in the range from 100 kHz to $10^{-3}$ Hz. In this manner, both the bulk resistance ($R_b$) and diffusion impedance ($Z_d$) of the electrolyte can be determined. The cation transference number $t_+$, can then be calculated from the relationship:

$$t_+ = (Z_d/R_b + 1)^{-1}.$$

A number of experiments were completed to establish the $D_+$ and $t_+$ of the new polymer/$LiClO_4$ SPE and the PEO control for comparison with the computer simulation results for these materials.

In another series of experiments, the cation diffusion coefficient ($D_+$) was determined using a chronopotentiometric method described by Ma et al (Ma, Y.; Doyle, M.; Fuller, T. F.; Doeff, M. M.; DeJonghe, L. C. and Newman, J., *J. Electrochem Soc.*, 142, (6), 1859–68, (1995). These authors developed this technique to measure $D_+$ using LiTf in poly(ethylene oxide). We used 8:1 O:Li $LiClO_4$ in PEO as a control and 8:1 O:Li $LiClO_4$ in our new polymer as the test SPE.

In addition to EIS, we used the Isothermal Transient Ionic Current (ITIC) method of Watanabe et al (Watanabe, M; Rikukawa, M; Sanui, K. and Ogata, N., J. Appl Phys., 58, (2), 736–740, (1985)) as a second, independent method to determine the cation transport number ($t_+$) for $LiClO_4$ in polyoxyamine. Watanabe measured $t_+$ of LiSCN in poly (ethylene succinate). Fritz and Kuhn (Fritz, H. P. and Kuhn, A., J. Power Sources, 41, 253–61, (1991)), employed the same technique to measure the $t_+$ of $LiClO_4$ in propylene carbonate (PC). We employed our test cell to measure the $D_+$ of 1M $LiClO_4$ in PC and 8:1 O:Li $LiClO_4$ in our test polymer.

The diffusion coefficients results for our test polymer SPE and two control SPEs prepared using PEO are summarized in the following table.

Table 1

Comparative Cation Diffusion Results for Various SPEs

| Sample | $D_+ cm^2/sec$ |
|---|---|
| PEO/LiClO$_4$ | $9.1 \times 10^{-8}$ |
| PEO/LiTf* | $7.5 \times 10^{-8}$ |
| Test polymer/LiClO$_4$ | $6.7 \times 10^{-7}$ |

Ma, Y.; Doyle, M.; Fuller, T.F.; Doeff, M.M.; DeJonghe, L.C. and Newman, J., J. Electrochem Soc., 142, (6), 1859–68, (1995).

As can be seen from these results, our experimentally determined $D_+$ for the controls agree well with literature results. As shown here, the $D_+$ for our test polymer SPE is nearly an order of magnitude greater than the $D_+$ for either PEO control. This is especially noteworthy in light of the $D_+$ for LiTf which is known to dramatically improve the ionic conductivity of PEO SPEs. These results suggest that our test polymer is preferentially promoting cation diffusion through the SPE.

Obtaining these results using LiClO$_4$ is remarkable considering the difficulty normally encountered in solubilizing this strong Lewis salt in polymers other than PEO.

The results of the ITIC EIS testing in which the cation transference number was obtained are presented in the next table.

TABLE 2

Cation Transference Number Results for Various SPEs

| Sample | ITIC $t_+$ | EIS $t_+$ | Literature $t_+$ |
|---|---|---|---|
| LiClO$_4$/PC | 0.43 | | 0.36* (1 M) |
| LiClO$_4$/test polymer | 0.68 | 0.71 | |
| LiClO$_4$/PEO | | 0.16 | 0.25 |

*Ue, M, J. Eletrochem. Soc., 141 (12), 3336–42, (1994).

As can be seen from these data, the $t_+$ results for our polymer in an SPE with LiClO$_4$ are significantly better than comparable controls using PEO. Our test results with the controls compare favorably with literature reports and there is continuity in the results for our test polymer SPE using two different test techniques. These results strongly suggest preferential cation transport in the test SPE.

Bulk conductivity results for the test SPE and a PEO control were obtained from the EIS data by extrapolating the impedance curve to the intersection with the real (Z') axis at high frequency, calculating the reciprocal of this value ($R_b$) and normalizing for the SPE thickness. The ionic conductivity of these two SPEs was found to be $8.6 \times 10^{-3}$ S/cm for the test polymer/LiIm SPE and $1 \times 10^{-7}$ S/cm for the PEO/LiClO$_4$ SPE control.

What is claimed is:

1. A polymer having the following structure:

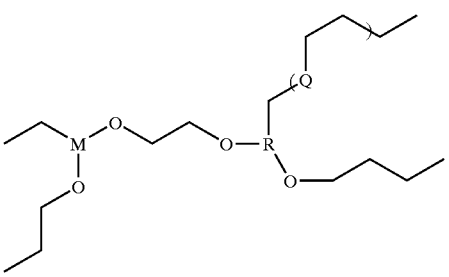

wherein R is an element selected from the group consisting of P, B, and Al, wherein M is an element that is either Si or Ti, wherein Q is an element chosen from the group consisting of S, O, and N, and wherein said phosphorous is either in the $^+3$ or $^+5$ oxidation state.

2. The polymer of claim 1, wherein said polymer has a molecular weight ($M_n$) ranging from about 400 to about 1,000,000.

3. A polymer comprising either one or more saturated alkyl or fluoroalkyl carbon links, wherein said links connect alternating nitrogen and oxygen atoms, alternatively, said links connect alternating oxy-phosphorus group and nitrogen, oxy-phosphorous with either an oxy-silicon group, oxyboron, oxyaluminum group or a combination thereof, wherein said oxy-phosphorous group can have a valence of III or V, and wherein said links includes crosslinkage, wherein said polymer has a molecular weight ($M_n$) of about 200 to about 1 million.

4. A polymer comprising either one or more saturated alkyl or fluoroalkyl carbon links, wherein said links connect alternating sulfur and oxygen atoms, alternatively, said links connect alternating sulfur and oxy-phosphorous group, oxyphosphorous with either an oxy-silicon group, oxyboron, oxyaluminum group or a combination thereof, wherein said oxy-phosphorous group can have a valence of III or V, and wherein said links includes crosslinkage, wherein said polymer has a molecular weight ($M_n$) of about 200 to about 1 million.

5. A polymer comprising either one or more saturated alkyl or fluoroalkyl carbon links, wherein said links connect alternating nitrogen atoms and oxyphosphorous groups, alternatively, said links connect either a nitrogen atom or an oxyphosphorous group through one or more saturated aryl, alkyl or fluoroalkyl carbon links to an oxysilicon group, oxyaluminum group or a combination thereof, wherein said oxyphosphorous group can have a valence of III or V, and wherein said links includes crosslinkage, wherein said polymer has a molecular weight ($M_n$) of about 200 to about 1 million.

6. The polymer of claim 3 or 5, wherein said nitrogen atoms are either fully or partially substituted with one or more aryl, alkyl or fluoroalkyl tertiary substituents.

7. The polymer of claim 6 further comprising an electrolyte salt, wherein said salt has a weight ratio sufficient to form a polymer electrolyte, and wherein said salt is selected from the group consisting of alkali metal, quaternary ammonium, quaternary phosphonium, sulfonylimide, and sulfonylmethide.

8. The polymer of claim 7, wherein said polymer is cast as a film.

9. The polymer of claim 3 or 5, wherein one or more phosphorous atoms of said polymer are either fully or partially substituted with one or more aryl, alkyl or fluoroalkyl tertiary substituents.

10. The polymer of claim 3 or 5, wherein said nitrogen and phosphorous atoms are either fully or partially substituted with one or more aryl, alkyl or fluoroalkyl substituents.

11. The polymer of claim 3, wherein said polymer is an oxyphosphorous polymer, and wherein said oxyphosphorous polymer is combined with a group selected from the group consisting of oxysilicon, oxyboron, oxyaluminium and a combination thereof.

12. The polymer of claim 3, wherein said links comprise one or more side chain substituents.

* * * * *